C. KLEINSCHMIDT.
Plasterer's Mold.
No. 222,505. Patented Dec. 9, 1879.
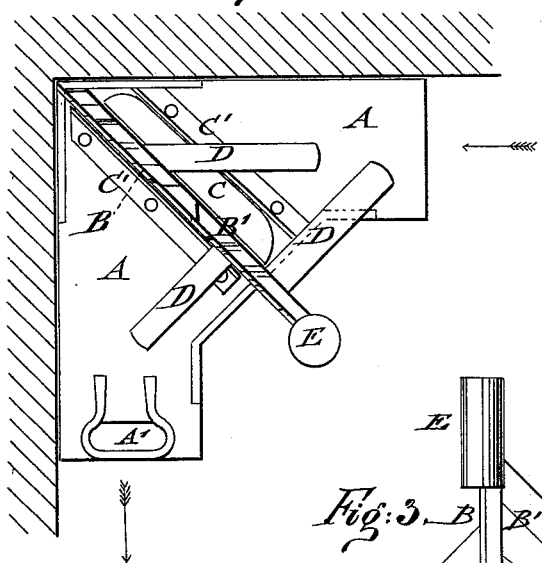
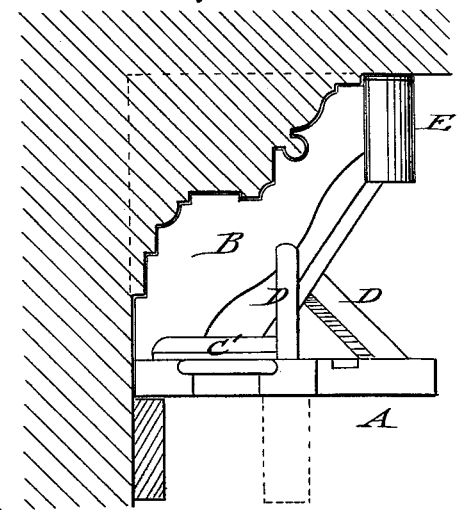
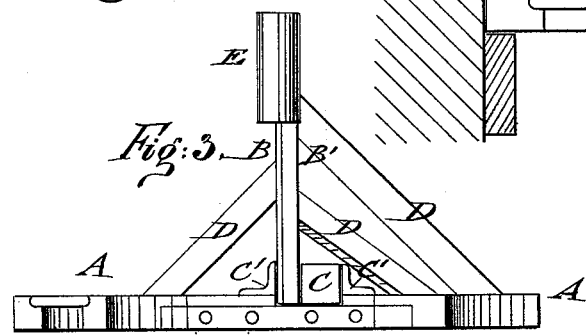
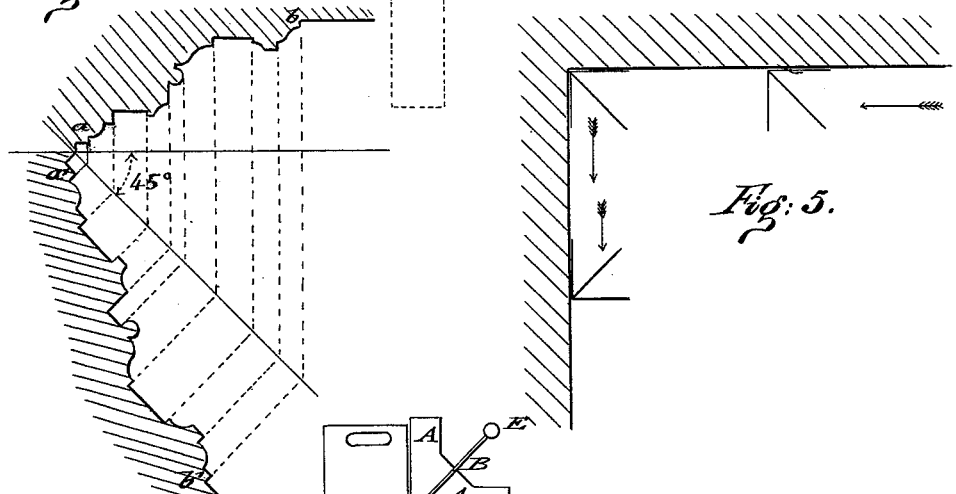
WITNESSES:
Carl Karp
Otto Risch
INVENTOR
Charles Kleinschmidt
By Paul Goepel
ATTORNEY

UNITED STATES PATENT OFFICE.

CHARLES KLEINSCHMIDT, OF BRUSSELS, BELGIUM, ASSIGNOR TO HERMANN LIPS, OF NEW YORK, N. Y.

IMPROVEMENT IN PLASTERERS' MOLDS.

Specification forming part of Letters Patent No. 222,505, dated December 9, 1879; application filed September 16, 1879; patented in Belgium June 11, 1878, and May 14, 1879.

*To all whom it may concern:*

Be it known that I, CHARLES KLEINSCHMIDT, of the city of Brussels, in the Kingdom of Belgium, have invented certain new and useful Improvements in Plasterers' Molds, (which have been patented in Belgium, and dated, respectively, June 11, 1878, and May 14, 1879,) of which the following is a specification.

In the accompanying drawings, Figure 1 represents a top view, Fig. 2 a side view, and Fig. 3 a rear elevation, of my improved plasterer's mold. Fig. 4 shows a diagram representing the method of projecting the diagonal profile for the mold. Fig. 5 shows the method of working the mold around the corner of a room; and Fig. 6 shows a top view of the mold in connection with the auxiliary-guide device for working around outwardly-projecting angles of a room, such as chimney-walls.

Similar letters of reference indicate corresponding parts.

This invention has for its object to furnish for the use of plasterers an improved mold, by which cornices or other moldings of any desired profile may be formed with greater facility, rapidity, and accuracy than with the common mold, a considerable saving in time and labor being effected, especially in forming the cornices of corners and projecting angles of the room.

The invention consists of a plasterer's mold the diagonal profile of which is supported on an angular base-frame having fixed converging angle-irons, to which and the frame the profile and its backing-piece are locked by a wedge-key and braced by side stays, as will be more fully described hereinafter, and then pointed out in the claims.

By the present mode of forming cornices, &c., a mold is used the profile of which is identical with that of the cornice, the same being obtained by intersecting the cornice at right angles to the wall. The mold is moved forward along a guide-strip until the corner is reached, where the connection with the cornice of the adjoining wall has to be formed by hand, by which considerable time is lost, especially when the profile is of elaborate design. In working around projecting angles, such as chimneys, the shorter side walls had to be formed separately and properly trimmed off, to be then put up and connected to the cornices of the wall.

In these operations a great deal of time is lost, which I desire to obviate by the use of my apparatus, to which I have given the name of "diagonal mold," and by which I am enabled to form the corners or projecting angles with great facility and in a superior manner. The apparatus used for this purpose differs in its principle in so far from the commonly-used mold that the profile is not taken at right angles to the cornice, but at an angle of inclination to the same. This angle of inclination is preferably an angle of forty-five degrees; but it is obvious that, whatever be the angle of intersection of the cornice, a profile whose angle of inclination is equal to the angle of intersection will produce the same cornice as the common profile obtained by a plane intersecting it at right angles.

By referring to the drawings, A represents the guide or base-frame of my diagonal mold, which frame is made of wood in the shape of a right-angled triangle. The sides of the guide-frame are faced with metal to be more durable. On the base-frame A is supported the profile B, of sheet metal, the plane of the profile being at right angles to the plane of the guide-frame A, but at the required angle of inclination to the plane of the wall. The profile B extends from the apex of the right angle of the guide-frame, and is re-enforced by a wooden backing, B', which has the same outline as the profile, but is beveled off to correspond to the angle of inclination for which the profile is constructed.

The diagonal profile is readily obtained by the simple geometrical projection shown in Fig. 4, in which $a\,b$ indicates the profile of the corner, $a'\,b'$ the diagonal projection of the same, and in which the angle inclosed by the base-lines of the profiles is equal to the angle of inclination for which the profile is desired. The diagonal profile B and its backing B' are rigidly secured to the guide-frame A by means of a wedge-key, C, and angle-irons C' C', which are attached to the guide-frame. One of the angle-irons extends at the proper angle of inclination of the profile B from the apex of the right angle of the base-frame, while the other angle-iron is placed convergingly thereto, as shown clearly in Figs. 1 and 3. The profile and backing B B' are, furthermore, braced by inclined stays D, which extend from the guide-frame to the profile and backing, as shown in Figs. 1, 2, and 3. The key, angle-irons, and stays support the profile rigidly at the required angle of inclination on the guide-frame, the stays serving also as handles for the mold.

To the upper end of the diagonal profile and backing B B' is attached a vertical guide-block, E, the upper horizontal surface of which is faced with metal. This block serves to guide the profile along the ceiling, while the base-frame is moved along the customary guide-strip attached to the wall, as shown in Fig. 2.

One end of the base-frame A is provided with a handle, A', for the purpose of pulling the mold, when it has arrived in a corner of the room, in the direction of the adjoining wall in the manner indicated by arrows in Figs. 1 and 5. The mold passes thus from one direction of the cornice directly into the other direction and forms the intersecting profile at the same time. When the mold is pulled to some distance from the corner it is turned around again and worked by pressure as before.

For molding the cornices of outwardly-projecting angles, such as of chimneys, &c., an auxiliary guide device of any desired construction is employed; if desired, that shown in Fig. 6 may be used, or the guide-strips of the walls may be extended to some distance beyond the angle and properly braced, so that the diagonal mold is steadily supported and can be worked around the projecting angles, forming thus the cornice directly and with perfect accuracy, without the necessity of separately molding the cornice-sections of the shorter side walls, as heretofore.

In case of heavy and elaborate cornices the diagonal mold may be made in two sections, as it would otherwise become too heavy for being conveniently handled by the plasterer.

I am aware that plasterers' cornice-molds with inclined diagonal profiles have been used heretofore, and I do, therefore, not claim them broadly.

Having thus described my invention, I claim as new and desire to secure by Letters Patent—

The combination of the angular base-frame A, having fixed converging angle-irons with interchangeable diagonal profile B, having backing B', and with locking wedge-key C, and stays D, essentially as set forth.

In testimony that I claim the foregoing as my invention I have signed my name in presence of two witnesses this 27th day of August, 1879.

C. KLEINSCHMIDT.

Witnesses:
 JNO. WILSON,
 C. MOHR.